United States Patent [19]

Tolles

[11] 3,862,295
[45] Jan. 21, 1975

[54] METHOD FOR SORPTIVE REMOVAL OF SULFUR GASES

[75] Inventor: Edward D. Tolles, Charleston, S.C.

[73] Assignee: Westvaco Corporation, New York, N.Y.

[22] Filed: June 30, 1972

[21] Appl. No.: 267,904

[52] U.S. Cl. .............................. 423/244, 423/522
[51] Int. Cl. ....... C01b 17/00, B01j 9/04, B01j 9/08, C01b 17/72
[58] Field of Search .......................... 423/242–244, 423/522

[56] References Cited
UNITED STATES PATENTS

| | | | |
|---|---|---|---|
| 3,318,662 | 5/1967 | Pauling | 423/522 |
| 3,578,390 | 5/1971 | Kruel et al. | 423/244 |

FOREIGN PATENTS OR APPLICATIONS

| | | | |
|---|---|---|---|
| 994,070 | 6/1965 | Great Britain | 423/522 |

Primary Examiner—Edward J. Meros
Assistant Examiner—Gregory A. Heller
Attorney, Agent, or Firm—Richard L. Schmalz; Ernest B. Lipscomb, III

[57] ABSTRACT

There is disclosed an improved process of sorbing noxious sulfur-containing gases onto activated carbon by increasing the moisture content of the gas being treated by injecting water either prior to or concurrent with the sorption reaction which substantially increases the rate of sorption and permits more accurate temperature control of the process. A bed of fluidized carbon moving substantially countercurrent to the gas being treated is one system found to be especially efficient and effective.

9 Claims, 3 Drawing Figures

METHOD FOR SORPTIVE REMOVAL OF SULFUR GASES

BACKGROUND OF THE INVENTION

1. Field of the Invention

This invention relates to a process and apparatus for removing noxious sulfur compounds from stack gas. More particularly, this invention is directed at improving the rate of sorption of activated carbon for sulfur oxides, e.g., sulfur dioxide and sulfur trioxide, from the stack gas and controlling the sorption temperature.

2. The Prior Art

Industrial power plants have traditionally employed sulfur-containing fuels having a sulfur content of about 3% or more, for generating power and/or heat because of the relative low cost and availability of such fuels. However, upon combustion the gaseous products evolved contain substantial concentrations of noxious sulfur oxides which are generally delivered to a stack for dispersion into the atmosphere. Of late, there has been increased sociological and ecological recognition for the need to reduce atmospheric contamination. In response to this growing awareness for a cleaner environment, stringent government regulations have been enacted limiting the concentration of pollutants which may be discharged into the atmosphere. Thus, there has been an increased demand for low sulfur-containing fuels. As anticipated, the demand has outstripped normally available supplies, thereby creating shortages of such raw material, and with it substantial cost increases. As a result of the less favorable economic situation for low sulfur fuels, conventional systems for removing noxious combustion gases prior to discharge to the atmosphere have been re-examined and a new impetus has been given to developing more efficient systems. In this manner, relatively low cost, high sulfur content fuels can be economically used without concomittant pollution effects. As will be appreciated, to economically utilize the high sulfur fuels, the cost of treating the stack gas, plus the cost of fuel should be competitive with the cost of utilizing low sulfur fuels.

Heretofore, numerous techniques, basically dry or wet processes, have been proposed and utilized for treating stack gases. One wet approach is to scrub the stack gas by contacting with water or chemicals. In U.S. Pat. No. 3,386,798, issued to Bevins et al. on June 4, 1968, sulfur dioxide and sulfuric acid vapors are chemically removed from the effluent gas by reacting the noxious gases with calcium chloride solution to form insoluble calcium sulfate, subsequently removed by filtration or the like. Generally, wet systems can be effectively employed when it is necessary to remove sensible heat from the high temperature stack gas. However, wet or liquid systems are difficult to maintain as they are corrosive, expensive to operate, and suffer from the further disadvantage of inherently lowering the discharge temperature of the stack gas to a level considered insufficient for properly dispersing the discharged effluent over a wide area.

Systems which utilize catalysts for converting sulfur gases to recoverable compounds have also been proposed. In U.S. Pat. No. 3,318,662, issued to Pauling on May 9, 1967, a plurality of fixed beds catalytically combine sulfur compounds with oxygen and water vapor in the gas to form sulfuric acid which is solubilized and recycled to initially humidify the stack gas, and later to dry the gas immediately prior to discharge. However, to effect catalysis, the influent gas temperature must be lowered substantially to about 50° C. or thereabouts. As with the aforesaid all wet or liquid systems, the reduced discharge temperature adversely affects dispersion of the effluent stack gas.

Among the dry processes is the use of granular adsorbents for selectively removing the sulfur compounds from the stack gas. Thus, conventional systems utilizing fixed beds of activated alumina, char or activated carbon have been used with good results. Dry processes generally operate at higher temperatures than wet processes giving good dispersion or buoyancy properties to the effluent. If buoyancy of the stack gas is not a factor, dry processes can be tailored to operate at lower temperatures.

Once dry system found particularly advantageous is described in U.S. Pat. No. 3,563,704 to Torrence, issued on Feb. 16, 1971 and assigned to the assignee of the present invention. In the Torrence system, the subject matter of which is incorporated herein by reference, stack gas is passed countercurrent against a fluidized activated carbon stream for effecting removal of sulfur compounds from the hot stack gas being treated. Regeneration of the spent activated carbon is continuously carried out by treatment with hydrogen sulfide or the like. After regeneration, the activated carbon is recycled for repetitive adsorption. This procedure offers significant improvements over previous dry systems by minimizing the quantity of adsorbent required for treating a given stack gas. The adsorption mechanism is described by Torrence in columns 3 and 4, as follows:

"Physical adsorption of sulfur dioxide by activated carbon at flue gas temperatures is very low, but sulfur trioxide by comparison is readily adsorbed. Consequently, satisfactory removal from the gas stream depends upon the carbon acting as a catalyst in the oxidation of sulfur dioxide to sulfur trioxide which is hydrolyzed to sulfuric acid if water vapor is present in the flue gas. The oxygen and water vapor necessary for the reaction are normally present in the flue gas, but they may be added if desired. The sulfuric acid thus formed is retained on the carbon surface and in this manner sulfur oxides are removed.

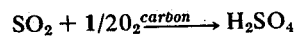

$$SO_2 + 1/2 O_2 \xrightarrow{carbon} H_2SO_4$$

One of the advantages of an activated carbon process is that sulfur oxide removal may be performed at flue gas temperatures."

It should be appreciated, however, that the aforesaid Torrence system is mainly concerned with the effective regeneration of spent activated carbon subsequent to sorption of sulfur compounds from stack gas or the like. This contrasts with the present invention which is mainly concerned with improving the sorption phase of a stack or flue gas treatment system. With respect to sorption of both sulfur trioxide and sulfur dioxide from flue gas, Torrence discloses a two-stage method wherein sulfur trioxide is adsorbed at about 300° F. to 350° F. and sulfur dioxide is adsorbed in a second stage above about 200° F. and below 300° F. To effect the temperature change required for second-stage adsorption, heat exchangers were provided. Considering the generally corrosive atmosphere and the low pressure drop requirements, the heat exchangers were extremely expensive, from a capital and operating point of view. Moreover, it was difficult to regulate and control the second-stage temperature, especially under changing inlet conditions as a result of time lags inherent in large heat exchangers. Maintaining temperature control is important during adsorption of sulfur oxides.

Accordingly, further research and development efforts were instituted directed at overcoming the aforementioned difficulties and at the same time reducing the system costs by improving the adsorption efficiency. The present invention is an outgrowth of such efforts.

A principal object of the present invention is to provide improved method and means for the utilization of high sulfur-containing fuels by economically treating the flue gas at normal stack gas temperatures prior to discharge to the atmosphere. Another important object of this invention is to provide an improved activated carbon sorption system for effectively removing the noxious sulfur compound gases from stack gas. Still another object of the present invention is to provide method and means for removing noxious sulfur compound containing constituents from stack gas which does not require the use of expensive heat exchangers. A further object of the present invention is to provide a single multi-stage sorption unit wherein means for automatically controlling the gas temperature between stages is provided. These and other objects will become apparent from the detailed disclosure and drawing which follow.

SUMMARY OF THE INVENTION

Broadly stated, the objects of the present invention are carried out by subjecting the stack gas to be processed to a water injection treatment either prior to gas-activated carbon contact, or, concurrent therewith. It might initially be thought that water injection would have little, if any, positive effect on improving the sorption capacity of activated carbon because the stack gas already contains sufficient moisture for forming sulfuric acid. However, it was surprisingly discovered that substantial improvements in the rate of sorption of sulfur oxides by activated carbon result when excess water is added to the stack gas. The term "excess water" as used herein means a predetermined quantity of water added to stack gas which exceeds the levels of moisture normally present in the stack gas as a result of combustion. Generally, the moisture content of stack gas evolved from combustion of carbonaceous fuels ranges from 6% to 12%, by volume. The amount of water required to convert sulfur oxides to sulfuric acid, according to the equations, $$SO_3 + H_2O = H_2SO_4$$

$$SO_2 + 1/2\ O_2 + H_2O\ \ \ = H_2SO_4$$

is relatively small, i.e., equal to the volume of sulfur oxides present in the gas. A sulfur oxide concentration in the stack gas of from 500 to 5,000 ppm or more is generally expected for most coals or oil. Thus, the stoichiometric quantity of water would be the same or roughly 0.1–0.5%. As indicated above, water generated by combustion greatly exceeds this minimum level and thus, prior to this invention there appeared to be little reason to add additional water to the gas.

The apparatus according to the present invention may comprise either one or more fixed beds or fluid beds containing the sorbent wherein $SO_2$ and $SO_3$ are sorbed from stack gas by the activated carbon sorbent. Oxidation and hydrolysis take place on the carbon to form $H_2SO_4$ from the sorbed gases according to the equations shown above. A single contact stage can be employed to remove $SO_3$ first, followed by a second stage for removing $SO_2$. Water injection means are provided in the sorber bed for increasing the rate of sorption. A multi-stage fluid bed adsorption unit is preferred for sorbing $SO_2$ from the stack gases.

BRIEF DESCRIPTION OF THE DRAWINGS

Having briefly summarized the present invention, reference is now made to the drawings wherein.

DETAILED DESCRIPTION OF OPERATION OF THE INVENTION

Figure 1:
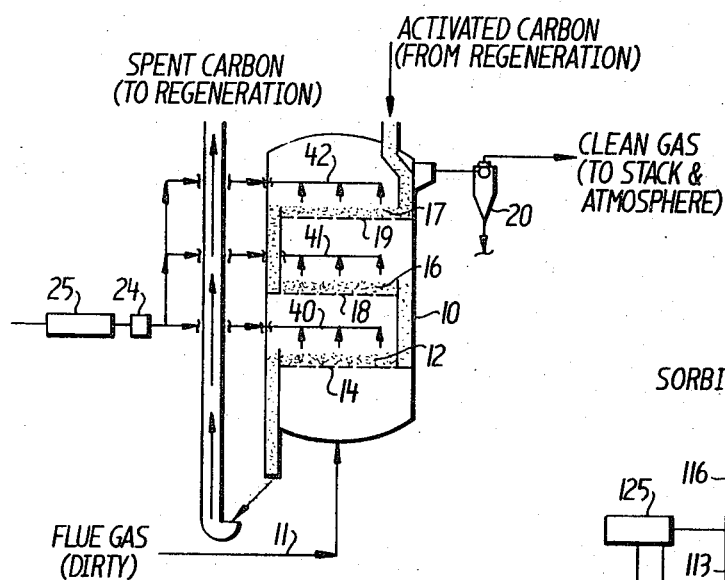
FIG. 1 shows a preferred embodiment of the apparatus of this invention utilizing a multi-stage fluidized sorption unit.

An important aspect of this invention resides in the discovery that the temperature dependency of the $SO_2$ sorption rate can be considered to be directly related to the temperature dependency of the relative humidity of water vapor in the gas being treated. Thus, at any temperature in the usual range of operation (about 150° F. to 300° F.) the rate of sorption of $SO_2$ can be described in terms of the relative humidity or relative pressure of water. Under a typical set of conditions, experimental sorption rate measurements gave the results shown in FIG. 3. where the sorption rate is shown to be a linear function of relative humidity over the 150° F. – 300° F. temperature range. Analytically, the rate under these conditions is thus given by the relation $$R = 0.549\ (P/P_o)^{0.733}$$

where R is the integral rate of sorption at a given loading of $SO_2$ and $P/P_o$ is the ratio of the partial pressure of water vapor in the gas to the saturation vapor pressure of water at the experimental temperature. From this it becomes apparent that the sorption rate of $SO_2$ can be significantly increased by increasing the relative humidity of the gas stream. This can be accomplished by increasing the concentration or partial pressure of water, or decreasing the temperature, or both. It is the point of this invention that addition of liquid water to the sorber system simultaneously raises the water concentration and lowers the temperature of the gas stream and both effects tend to raise the relative humidity so as to promote an increased rate of $SO_2$ sorption.

It should, therefore, also be appreciated that according to the present invention, lower operating temperatures are obtained despite the presence of an exothermic reaction. This leads to another important aspect of the present invention, which resides in the fact that when lower sorption gas temperatures are employed, e.g., 135° F. or lower, considerable cost savings in both capital expenditures and operating costs are effected. Generally, the broad range of operating temperatures is from about 135° F. to about 500° F., with from about 175° F. to about 350° F. being the preferred range. To briefly illustrate the advantageous effect of adding water to the flue gas, assume that the gas entering the adsorber has a $SO_2$ content of about 2,000 ppm, a moisture content of about 8% and a temperature of about 300° F. Under these conditions, the exothermal heat resulting from adsorption would cause about a 30° F. rise in gas temperature. By injecting predetermined quantities of excess water into the gas stream, either ahead of or in the sorber, the final or exit temperature of the stack gas can be closely controlled. Where only enough excess water is injected to remove the exothermal heat and therefore prevent the expected temperature rise, the rate of sorption is increased by about 10%, while the moisture content of the gas increases by only about 1%, from about 8% to about 9%. It should be emphasized that the "excess water" sprayed or otherwise injected evaporates into the gas stream and the process remains dry. As earlier indicated, excess water added to the gas stream adds to the amount of water already present in the effluent stream by virtue of the combustion process. The amount of excess water present is generally below the quantity which would saturate the activated carbon.

From the foregoing, it will be understood that an increase in the adsorption rate of sulfur oxide removal is directly translatable into cost reductions. For example, the quantity of activated carbon required to process a given amount of stack gas can be reduced. This, in turn, reduces the size of equipment, as well as the utilities required for both sorption and regeneration.

DETAILED DESCRIPTION OF PREFERRED EMBODIMENTS

Figure 2:
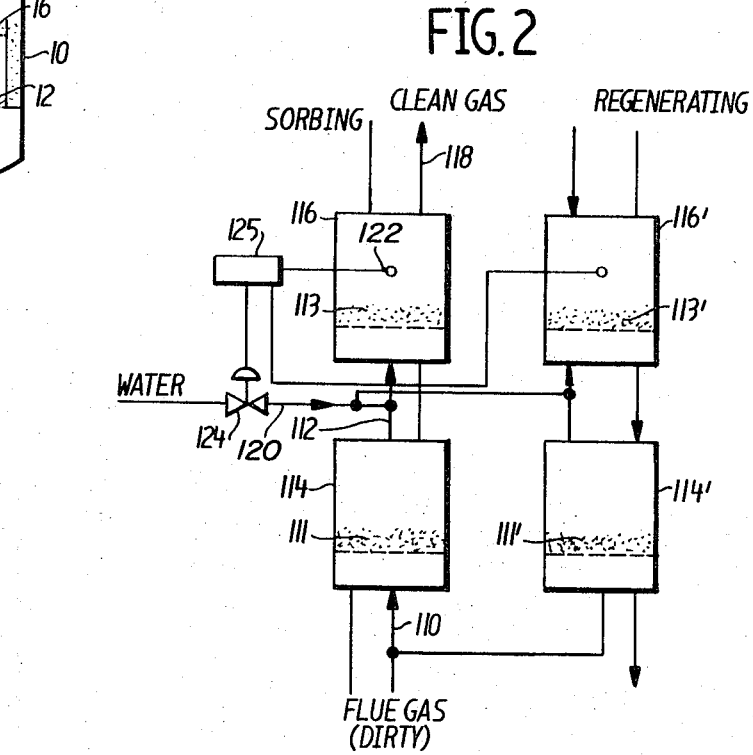
FIG. 2 shows another embodiment of the apparatus of this invention illustrating a plurality of fixed bed sorption units.

Referring to FIGS. 1 and 2 of the drawing, there is illustrated two embodiments of the sorption system according to this invention for removing sulfur oxides from flue gases prior to discharge to a power plant stack or chimney. As used throughout this specification, the terms "stack gas" and "flue gas" are interchangeable and describe the gases which evolve from combustion of the fuel used in generating power, heat or the like, and other flue gases from sulfur oxide producing processes such as Claus units, smelters and the like. Typically, power plant flue gas comprises mostly nitrogen, carbon dioxide and water vapor. The sulfur compounds and oxygen present therein are minor constituents, in various concentrations depending upon the gas stream source, represented by volume as:

| Constituent | Concentration |
| --- | --- |
| Sulfur trioxide ($SO_3$) | up to 500 ppm |
| Sulfur dioxide ($SO_2$) | 500–5000 ppm |
| Oxygen ($O_2$) | 2–6% |

In FIG. 1, there is shown a preferred apparatus for carrying out the process of this invention as represented by a multi-stage fluidized bed system contained in a single tower 10. Tower 10 includes a lower sorbent bed 12 supported on a first perforated plate 14, a second sorbent bed 16 supported on a second perforated plate 18, and a third or upper sorbent bed 17 supported on perforated plate 19. Preferably, the sorbent used in beds 12, 16, 17 is activated carbon, as aforementioned. It should be appreciated that the number of sorption beds will vary depending upon the process conditions.

In operation, flue gas leaves the power plant or other plant effluent stream (not shown) through line 11, passes upwardly through beds 12, 16, 17 into cyclone 20, and is discharged from the cyclone through a chimney into the atmosphere substantially free of sulfur compounds. Temperature sensing means (not shown) are disposed in bed 12, 16 and 17 and controls the amount of water introduced into the sorbent beds by spray 40, 41, 42 through controls 24. Temperature controller 25 can be utilized for faster response.

Where the $SO_3$ concentration in the flue gas is substantially zero, or, where corrosion effects can be negated, the sorbent beds can be combined as a single tower. Activated carbon is the preferred sorbent, however, any carbonaceous sorbent can be used, if desired, but with a lesser economic advantage.

The embodiment illustrated in FIG. 2 operates on the same basic principal as that shown and described for FIG. 1, except, a number of fixed beds are provided in lieu of multi-stage fluidized bed tower 10.

In FIG. 2, the flue gas leaves the power plant (not shown) at an elevated temperature and is directed through lines 110, 112 through sorbent 111, 113, in towers 114, 116 and into the atmosphere via a chimney or stack represented by reference numeral 118. Towers 114 and 116 are conventionally constructed of a suitable material, such as mild steel, or the like. Granular activated carbon is preferably employed as the sorbent 111, 113, suitably supported in the towers 114, 116. Tower 114 is provided with sufficient sorbent 111 to remove sulfur trioxide present in the flue gas and, as earlier mentioned, generally is operated at a temperature above the dew point of $SO_3$. The flue gas leaves tower 114 through line 112 and is sprayed with water entering from line 120. Temperature sensing means 122 positioned in sorbent 113 of tower 116 automatically regulates the sorption temperature by actuating water control valve 124 in a manner well known in the art. Temperature controller 125 is used for faster and more accurate control of valve 124. Alternatively, the water injection can be manually controlled for any given set of conditions. In this manner, the moisture content of the gas entering tower 116 and the temperature of sorption are controlled. When one of the fixed beds is saturated with sorbed sulfuric acid the gas stream is diverted through identical fixed beds 111' and 113' of the previously regenerated towers 114', 116'.

Although the fixed beds of FIG. 2 may be adequately employed, for optimum gas-solids contact a fluidized bed system such as the type shown in FIG. 1 is preferred. Various techniques for injecting water into the gas stream can be used. These include directly spraying water through a spray nozzle, perforated pipe, etc., or, by passing the gas through a packed column wetted with water. The important consideration is control of the moisture content of the gas as it contacts the sorbent, rather than the particular mode employed for introducing the water.

It should also be mentioned that the embodiments of FIGS. 1 and 2 are illustrated without showing means for regenerating the sorbent. This can be readily accomplished in the embodiment of FIG. 2 by providing duplicate towers whereby one tower is in operating condition for treating the flue gas, while the other tower sorbent is being regenerated. Upon completion of regeneration, means for reversing the procedure can be provided. In the embodiment of FIG. 1, the carbon is continuously regenerated as in a manner described by Torrence, U.S. Pat. No. 3,563,704.

Having described the invention in general terms, the following examples are presented to more particularly illustrate the present invention. These examples are not to be limiting.

EXAMPLE 1

Figure 3:
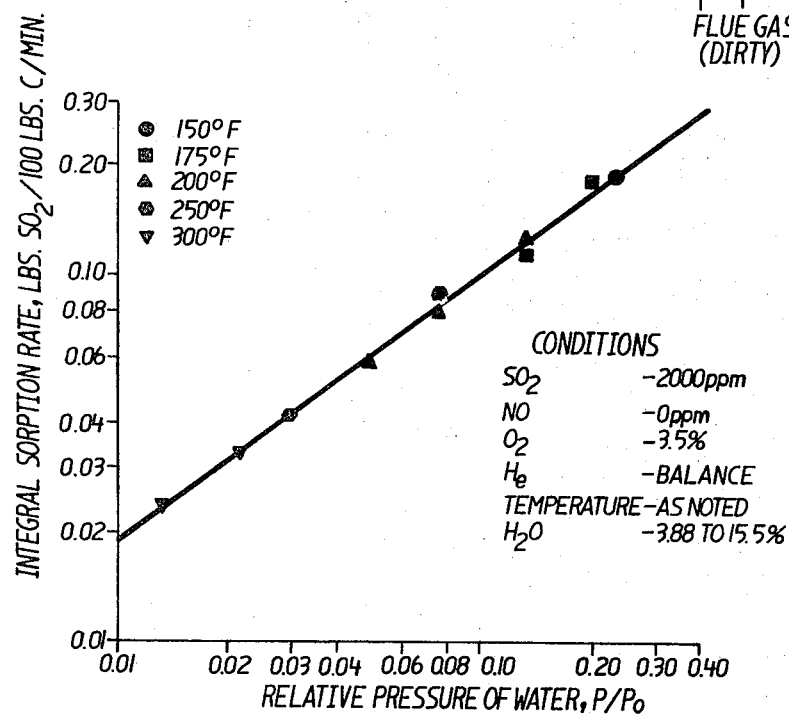
FIG. 3 illustrates the effect of humidity on sulfur dioxide sorption rates.

To show the effects of the water spray or sorption rate of sulfur dioxide at various temperatures and water concentrations, a simulated flue gas stream containing 2,000 parts per million of sulfur dioxide was passed through a bed of activated carbon in a differential rate sorption measuring apparatus at various temperatures and water content. The results are shown in FIG. 3 which is a graph showing the effect of humidity on the $SO_2$ sorption rates. The data was taken at various temperatures and $H_2O$ concentrations, expressed as relative pressure of water. The rates shown are integral rates for loadings up to 11 pounds $SO_2$ per 100 pounds activated carbon. It is clearly seen from FIG. 3 that the sorption rate is significantly increased at any of the given temperatures by increasing the humidity. Concurrently, the sorption rate is also enhanced at lower operating temperatures.

EXAMPLE 2

An 18 inches diameter adsorber tower was used to treat flue gas from a gas-fired steam plant employing the fluidized bed system shown in FIG. 1. The flue gas flow rate was 15,250 SCFM (measured at 70° F.), having a composition comprising 995 ppm $SO_2$, 3.1% by volume $O_2$ and 12.7% by volume $H_2O$. The inlet gas temperature measured 310° F. Activated carbon at the rate of 23.2 pounds per hour was passed downwardly through the tower countercurrent to the upwardly-flowing flue gas giving a carbon bed height per stage of about 3-4 inches. The temperature at the second stage was kept at about 175° F. by the injection of about 29.8 pounds of water per hour. This addition raised the moisture content of the inlet flue gas from 12.7% to 16.4%.

The thus-treated flue gas had an outlet $SO_2$ concentration of about 69 ppm, that is, more than 90% of the $SO_2$ present in the inlet flue gas was removed. The bulk of the $SO_2$ removal occurred in the last three stages after the additional moisture was injected. Leaving the first stage, the gas $SO_2$ content measured 925 ppm, a decrease of about 70 ppm. This contrasted with a $SO_2$ reduction in the other stages which ranged from 194 to 384 per stage.

From the foregoing examples and earlier description, it will be clear that the method and apparatus according to the present invention yield substantial improvements in the sorptively removed sulfur oxides from flue gas:

Summarizing, the present invention offers the following advantages: eliminates the need for large gas coolers, and improves the rate of sorption of sulfur oxides by activated carbon which permits a reduction in the quantity of carbon needed to process a given quantity of stack gas and further reduces the size of equipment and operating costs for treating flue gas.

It should be appreciated that the present invention is not to be construed as being limited by the illustrative embodiments. It is possible to produce still other embodiments without departing from the inventive concepts herein disclosed. Such embodiments are within the ability of those skilled in the art.

What is claimed is:

1. A dry process for sorptively removing sulfur dioxide and sulfur trioxide from a flue gas comprising:
  a. providing a flue gas containing sulfur dioxide, sulfur trioxide, oxygen, and water vapor in amounts sufficient to convert said sulfur trioxide and sulfur dioxide to sulfuric acid at a temperature between 135°F. and 500°F.;
  b. passing said flue gas through a fluidized bed of unimpregnated, activated carbonaceous sorbent whereby said sulfur trioxide and sulfur dioxide are converted to sulfuric acid and sorbed onto said activated carbonaceous sorbent, and controlling the temperature rise of the exothermic reaction by adding sufficient water to said flue gas to maintain the temperature between 135 °F and no higher than the initial flue gas temperature:;
  c. discharging said flue gas to the atmosphere; and
  d. regenerating the sulfuric acid containing activated carbonaceous sorbent.

2. The process according to claim 1 wherein said sorbent is granular activated carbon particles.

3. The process according to claim 1 wherein further comprising, passing said flue gas prior to the addition of water through a portion of the activated carbonaceous sorbent at a temperature above the sulfur trioxide dew point.

4. The process according to claim 1 wherein said flue gas is at a temperature between about 175°F. and 350°F.

5. The process according to claim 2 wherein said granular activated carbon particles are continuously moved in a substantially countercurrent direction to the travel path of said flue gas.

6. The process according to claim 1 wherein said water is added as a vapor.

7. The process according to claim 1 wherein said water is added as a liquid.

8. The process according to claim 1 wherein said water is added to said flue gas prior to contact with said activated carbonaceous sorbent.

9. The process according to claim 1 wherein said water is added to said flue gas while said flue gas is in contact with said activated carbonaceous sorbent.

* * * * *